United States Patent [19]

Avedesian

[11] Patent Number: 4,493,797
[45] Date of Patent: Jan. 15, 1985

[54] APPARATUS AND METHOD INVOLVING SUPERCRITICAL FLUID EXTRACTION

[76] Inventor: Michael M. Avedesian, 128 Beacon Hill Rd., Beaconsfield, Quebec, Canada, H9W 1S9

[21] Appl. No.: 564,500
[22] Filed: Dec. 22, 1983
[51] Int. Cl.$^3$ ............................................... C07G 1/00
[52] U.S. Cl. ................................................... 530/507
[58] Field of Search ........................................... 260/124

[56] References Cited
PUBLICATIONS

Chem. Abstr., vol. 66, (1967), 56775m.
Chem. Abstr., vol. 84, (1976), 123660g.

Primary Examiner—Delbert R. Phillips

[57] ABSTRACT

An autoclave extraction apparatus using supercritical fluid is used for supercritical fluid extraction of one or several compounds. The supercritical fluid containing the compound(s) may then be processed in a pressurized bed reactor under supercritical conditions. The bed being a fluidizable catalytic bed to carry out a catalytic reaction of the compound(s).

The method is particularly applicable to recover valuable lignin and other extractable components from kraft black liquor.

10 Claims, 2 Drawing Figures

APPARATUS AND METHOD INVOLVING SUPERCRITICAL FLUID EXTRACTION

FIELD OF THE INVENTION

This invention is directed to a method to recover valuable lignin and other extractable components from kraft black liquor using supercritical fluids and to convert said recovered lignin into chemical products and to apparatuses to carry out reactions of supercritical fluids. By supercritical fluids is meant a gas or a liquid at a temperature above its critical temperature and a pressure above its critical pressure.

PRIOR ART

An extensive literature search conducted by the inventor has revealed that no one has published any information which may have bearing on applicant's invention:

The search has revealed that no one has thought of extracting lignin and other components from black liquor using supercritical gases, nor of reacting lignin dissolved in supercritical gaseous product in a fluidized bed catalytic reactor.

The following is a brief review of the current black liquor recovery process in which the polymeric lignin is combusted to $CO_2$ for its fuel value: It is recognized that the Kraft process for pulp production will be used by the industry for many years to come. The pulping chemicals NaOH and $Na_2S$ extract lignin from the wood to produce a pulp and a weak black liquor. The weak black liquor contains water, organic lignin derivatives, hydroxy acids and inorganic compounds derived from the sodium. An essential criterion for the economic viability of the Kraft process is the recovery of inorganic chemicals for recycle to pulping and the production of process steam. The original Tomlinson recovery furnace was developed in the 1930's. Since that time, several modifications and design improvements have been carried out, however the original concept is still retained and universally practiced throughout the industry. Weak black liquor is concentrated to about 65% total solids in multiple effect evaporators and burnt in the recovery furnace at about 980° C. The organic constituents in the black liquor provide the fuel for combustion. The resultant inorganic $Na_2CO_3$ and $Na_2SO_4$ form a smelt (at these high temperatures) at the bottom of the furnace and pass through a char bed where the $Na_2SO_4$ is reduced to $Na_2S$. Subsequently, the $Na_2CO_3$ is causticized with CaO to regenerate the NaOH required for pulping. The recovery furnace contains boiler tubes in which steam is raised for process purposes.

The two major shortcomings of this conventional process are the smelt/water explosions and the high capital and operating costs. Periodically, the steam tubes inside the furnace burst causing water to flow on the smelt and explode. These explosions are dangerous and have sometimes caused death. They are extremely costly and the insurance premiums are high. The maintenance costs are also high because of the above.

This new method offers many technical and economic advantages over the conventional black liquor recovery furnace technology in which the lignin derivatives are simply burnt for their fuel value.

BROAD DESCRIPTION OF THE INVENTION

In the proposed supercritical fluid extraction process, the lignin is recovered and converted, in applicant's invented apparatuses, to higher value added products and the inorganic values are recycled to pulping.

The novel process offers the opportunity to recover the valuable lignin (natural high molecular weight polymer) and convert it to useful chemical products of a very high value-added, instead of burning it for its fuel value and thus to $CO_2$ which eventually goes up the stack. In addition, the energy savings in evaporation and chemical recovery make this process very attractive to the industry.

Broadly stated this invention is directed to a method to extract lignin from black liquor using supercritical fluids and while maintaining said lignin dissolved in the supercritical state to feed the same in a fluidized bed catalytic reactor to convert said lignin to high value added chemical products and to special apparatuses for carrying out said method. Preferably this method is conducted using supercritical $CO_2$ and the supercritical gas containing lignin is reacted in a fluidized bed catalytic cracker to produce lower molecular weight higher value added products:

There are many specific advantages of supercritical fluid extraction of lignin and subsequent conversion to higher value added chemical products.

For example, with supercritical fluid extraction:

(i) its mutual solubility with water is small and it can therefore be used as a solvent to extract organics from aqueous black liquor.

(ii) supercritical fluid diffuses as a gas (very high diffusivity) yet has the solvent carrying capacity of a liquid.

(iii) the reaction rate of lignin dissolved in supercritical fluid in a fluidized bed of catalyst is very high because the supercritical fluid will have the density of a liquid and yet have the diffusivity characteristics of a gas.

(iv) the separation of lignin from the aqueous solution of inorganic compounds is facilitated with supercritical fluid.

(v) the economic benefit of this process is the recovery of lignin and its conversion to high value added specialty chemicals. This is even more so when $CO_2$ is used, in that case for example:

(vi) supercritical $CO_2$ has a very high volatility compared with the organic extracted, thus facilitating its separation from extract solutions for product recovery and $CO_2$ recycle.

(vii) The $CO_2$ critical temperature (31.06° C.) and pressure (73.8 bar) are readily accessible with well established process technology and equipment. Supercritical $CO_2$ is non-toxic, non-flammable, not corrosive and readily available at relatively low cost.

BRIEF DESCRIPTION OF THE DRAWINGS

Further features, objects and advantages will be evident following detailed description of the preferred embodiments of the present invention taken in conjunction with the accompanying drawings in which.

DESCRIPTION OF THE PREFERRED EMBODIMENTS

Figure 1:
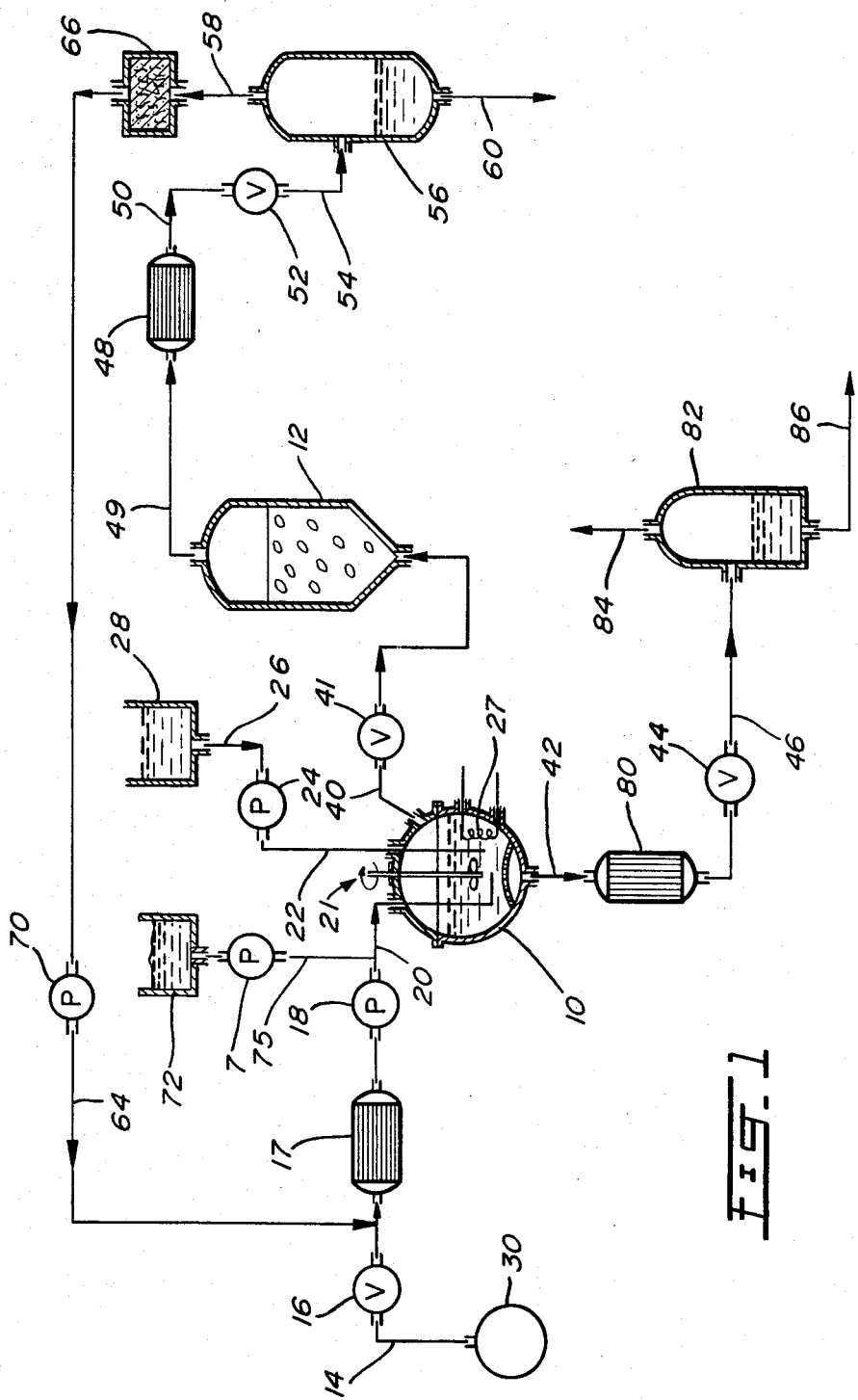
FIG. 1 is a process flow sheet illustrating one form of the present invention.

As shown in FIG. 1, the apparatus to conduct my method consists of a pressurized autoclave extractor 10 cooperating with a pressurized fluidized bed 12.

A $CO_2$ feed line source 14 conveniently at ambient temperature is provided with a flow control valve 16 followed by a heat exchanger 17 to raise the temperature of the $CO_2$ to above the supercritical temperature and a compressor 18 for raising the pressure of the $CO_2$ to above the supercritical pressure. The compressor is itself joined via line 20 to the high pressure autoclave extractor 10 which is generally thermally insulated and provided with conventional heating means 27, and mixing means schematically represented by 21.

There is also connected to said autoclave extractor 10 via line 22 a positive displacement pump 24 to feed black liquor into the autoclave at the autoclave pressure from line 26. The autoclave 10 is internally or externally heated by the conventional means schematically shown by 27 when necessary. The black liquor source may be fed directly from line 26 or may be conveniently contained in a reservoir or tank 28 and when needed fed via line 26. The $CO_2$ source may also originate from a storage tank 30 by maintaining the $CO_2$ in liquid or gaseous form inside the tank at a suitable pressure.

The autoclave extractor is maintained at or above the critical temperature and pressure of the solvent. In the case of $CO_2$ this is above 31.1° C. and above 73.8 bar.

Any black liquor resulting from the making of pulp whether from kraft, sulfite or other methods may be fed into the autoclave as long as in said liquor is present the valuable lignin component or its derivatives produced during pulping.

The high pressure autoclave extractor 10 has several functions: namely that of mixing or bringing together the supercritical fluid with the black liquor, maintaining the fluid in said supercritical fluid state, transporting the lignin from the black liquor to the supercritical fluid whereby the supercritical fluid dissolves the lignin and immediately thereafter bringing said supercritical fluid containing said lignin to the fluidized bed 12 by means of a line 40 joining the upper portion of the autoclave extractor to the lower portion of the fluidized bed 12, while removing the lignin depleted aqueous liquor outside said autoclave extractor 10. A pressure regulating valve 41 in line 40 controls the desired pressure in the fluidized bed reactor.

One way to remove said lignin depleted aqueous liquor is to provide the bottom, or the lower portion, of the autoclave where the liquid is present, with a line 42 and a pressure letdown valve 44. Then the aqueous liquor substantially lignin free, may be disposed at 46 as is well known in the art, and such as is disclosed hereinabove under the heading prior art.

While in the supercritical state, the lignin is catalytically reacted in the fluidized bed generally in its lower portion and is allowed to react with the catalyst present in said bed, to raise above said bed and to escape at the upper portion.

The upper portion of the high pressure fluidized bed catalytic reactor is connected to a heat exchanger 48 by means of product lines 49 and 50. Line 50 is itself provided with a pressure letdown valve 52 connecting line 54 to a product separation tank 56. The product separation tank which is at reduced pressure, has an upper outlet 58 for delivering the gaseous fraction, and a lower outlet 60 for delivering the liquid and solid fraction of the lignin derivatives. Preferably and generally outlet 58 is connected by line 64 to line 14 and the reservoir 30 is used only to supplement for the lost amount of supercritical fluid occuring during the process. The line 64 includes a filter 66 to remove any liquid or solid particles escaping outlet 58. A compression 70 is included in line 64 after the filter 66 to boost the pressure of the supercritical fluid to the pressure in line 14.

The catalyst and other reaction conditions in the high pressure fluid bed such as pressure, temperature, flowrate, depend upon the products one wishes to obtain. The pressure is generally below that found in the autoclave extractor and can be as low as 2 bars, but always above the supercritical pressure and the temperature may range as high as 50° C. and is always over and above the supercritical temperature. Catalysts contemplated include acid-treated natural aluminosilicates, amorphous synthetic silica-alumina combinations, crystalline synthetic silica-alumina catalysts called zeolites or molecular sieves, and crystalline mixtures of silica-alumina with a small uniformly distributed amount of rare earths contained within the crystalline lattice.

Once the lignin is reacted to products they escape via line 49 and by allowing the temperature to drop by heat exchanger 48 as well as a drop in pressure, the supercritical fluid is allowed to disengage from the lignin derivatives and to escape the tank 56 via the line 58. The solid and liquid particles are trapped by filter 66, while the gas is recycled via lines 64 and 14. The lignin derivatives, which are generally liquid with possibly some solids, are collected at 60. These derivatives may be separated and purified by conventional means such as centrifugation, filtration, solvent extraction, distillation and crystallization.

If desired, a promoter to enhance the extraction process may be added for instance by means of a reservoir 72 containing said promoter and joined by line 75 and pump 7 to line 20.

A more efficient way to remove the lignin depleted aqueous liquor is to insert in line 42 a heat exchanger for raising the temperature of said depleted liquor, a pressure let down valve 44 to reduce the pressure and to connect line 46 to a product separation tank 82, where the solution is allowed to flash and where steam is collected by line 84 and a concentrated liquor containing inorganic salts is obtained at 86.

Figure 2:
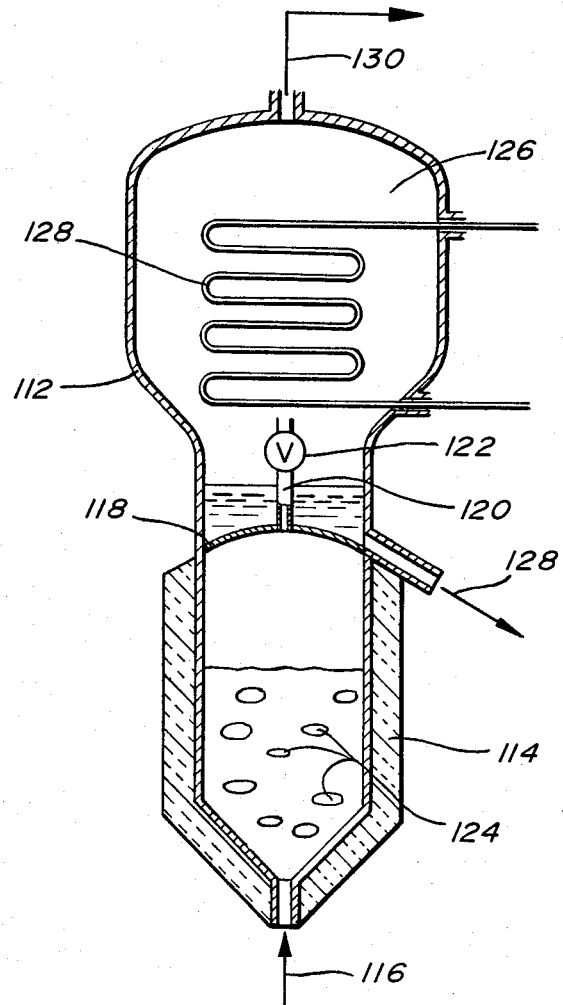
FIG. 2 illustrates another form a pressurized fluidized bed in accordance with the present invention.

As shown in FIG. 2, a pressurized fluidized bed reactor 112 is provided with insulation 114, inlet 116 and partition or impervious 118 provided with outlet conduit 120 itself provided with a pressure reducing valve 122. Within the lower portion of the fluidized reactor the fluidizable catalytic bed 124 is able to react on a compound dissolved in a supercritical fluid entering inlet 116 and raising through the bed 124 up to outlet conduit 120 to a disengaging zone 126 provided with heat exchanger condenser 128. The disengaging zone 126 has a lower portion defining a reservoir for liquid and solid products, said reservoir being provided with outlet 128. The disengaging zone is also provided with gas outlet 130.

EXAMPLES

Example 1

The following will serve only to illustrate particular embodiments of the invention. Weak black liquor containing about 14% solids is continuously fed to the autoclave 10. Carbon dioxide from the storage tank 30 is mixed with recycled $CO_2$ and heated to 60° C. via heat exchanger 17 and compressed to 150 bar via compressor 18. The autoclave 10 is thermally insulated and heated by conventional means to maintain the temperature of the contents at 60° C. The supercritical $CO_2$ containing the liquor derived organic compounds leaves the autoclave via line 40 and the pressure is reduced by the pressure regulating valve 41 to the desired operating pressure of the fluidized bed which in this example is 5 bar. In this example, the reaction produces carbon (coke) which remains on the catalyst particle and rapidly lowers its activity. To maintain the catalyst activity, the catalyst is regenerated by burning off this carbon using air.

Regeneration may also be carried out by having two similar fluidized beds in parallel and operated in a cyclic fashion such that while one bed is in the reaction mode, the other bed is in the regeneration mode. Another regeneration method is to have a separate regeneration bed and to move the catalyst from the reactor bed to the regeneration bed.

Since the cracking reaction is endothermic and the regeneration reaction is exothermic, the fluidized bed system may be kept in thermal balance at the desired reaction temperature of 500° C. The catalyst is a highly reactive zeolite cracking catalyst and under these conditions produces a product containing benzene, toluene, zylene, phenols and longer chain aromatic hydrocarbons. The product is collected in the separating vessel 56 and removed via 60. The product is separated into separate products via conventional technology using for example distillation.

Example 2

Although the above Example 1 illustrates catalytic cracking in the fluidized bed reactor, in Example 2, the reactions carried out were hydrocracking that is catalytic cracking with hydrogenation superimposed. The hydrocracking catalyst consists of a crystalline mixture of silica-alumina with a small uniformly distributed amount of rare earths contained within the crystalline lattice. The silica alumina promotes cracking while the rare earth metals encourage hydrogenation. One typical example was a cobalt/molybdenum mixture on activated alumina. The hydrocracking reactions were generally carried out at average catalyst temperatures between 250° C. and 450° C. and at reactor pressures between 70 bar and 200 bar with a separate feed of hydrogen supplied to the fluidized bed in order to carry out the reactions. In a preferred embodiment the unreacted hydrogen was separated from the product stream leaving the fluidized bed and recycled to the inlet for economical purposes. Since the cracking reactions are endothermic and hydrogenation is exothermic, the system may be operated in thermal balance with little or no auxiliary energy required.

Products produced were more fully saturated aromatic compounds such as cyclohexanes, cyclopentanes, cycloöctanes and their olefinic and aliphatic derivatives, phenols and benzene. Further cracking produced straight chain molecules. In order to remove more efficiently the lignin depleted aqueous liquor, the system as shown on FIG. 1 was used including a heat exchanger 80 and a product separation tank. The pressurized autoclave extraction 10 operating in the order of 60° C. The lignin depleted liquor in line 42 was raised to a temperature of the order of 120° C. to 300° C. During this operation, it became clear that steam could be obtained at 84 and a concentrated liquor at 86 which included the sodium carbonate and other sodium salts.

Example 3

In another example carried out as in Example 1 to the supercritical $CO_2$ fed in line 14, was added a promoter (dimethyl ether) for enhancing the extraction process in autoclave 10.

Example 4

Other supercritical fluids suitable for extraction of lignin were used. For instance acetone, tetrahydrofuran, dioxane and toluene. However, these supercritical fluids are generally less practical and therefor less preferred, from an industrial viewpoint than $CO_2$. Although they may be preferred if one wished to react the same with the lignin derivatives in some cases.

Modifications may be made without departing from the spirit of the invention as defined in the appended claims.

I claim:

1. A method to extract lignin from a black liquor containing lignin comprising (2) dissolving a black liquor containing lignin in a supercritical fluid, at about or above critical temperature and pressure, (b) separating the black liquor depleted from said lignin from the supercritical fluid containing lignin.

2. The method as defined in claim 1 wherein the lower molecular weight lignin derivatives are carried out from said fluidized bed to a reduced pressure and temperature tank to be disengaged from the supercritical fluid.

3. The method as defined in claim 2 wherein the supercritical fluid so disengaged is recycled.

4. The method as defined in claim 1 wherein the supercritical fluid is a member selected from the class consisting of acetone, tetrahydrofuran, dioxane, toluene.

5. The method as defined in claim 1 wherein the supercritical fluid is carbon dioxide.

6. The method as defined in claim 1 wherein a promoter is added to the supercritical fluid $CO_2$ to accelerate and enhance the extraction process.

7. The method as defined in claim 1 wherein following step (b) the supercritical fluid containing lignin is fed to a fluidized bed catalytic cracker reactor having fluidizable zeolite cracking catalyst to produce lignin derivatives including benzene, toluene, xylene, phenols and longer chain aromatic hydrocarbons.

8. The method as defined in claim 7 wherein the reaction temperature of the fluidized bed catalytic reactor is between 200° C.–700° C. and the pressure is between 2–200 bar.

9. The method as defined in claim 7 wherein the super critical fluid containing lignin is fed with hydrogen at a temperature between 250°–450° C. under a pressure of 70–200 bar to a fluidized bed catalytic hydro-crack reactor having fluidizable crystalline mixture of silica alumina with a small uniformly distributed amount of rare earths contained within the crystalline latice.

10. The method according to claim 1 wherein following step (b), the supercritical fluid containing lignin is fed to a fluidized bed catalytic reactor to promote chemical rearrangement of said lignin into lower molecular weight lignin derivatives.

* * * * *